United States Patent
Evans

(10) Patent No.: US 10,488,602 B2
(45) Date of Patent: Nov. 26, 2019

(54) FIBER-TO-WAVEGUIDE OPTICAL INTERFACE DEVICES AND COUPLING DEVICES WITH LENSES FOR PHOTONIC SYSTEMS

(71) Applicant: Corning Optical Communications LLC, Hickory, NC (US)

(72) Inventor: Alan Frank Evans, Beaver Dams, NY (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 16/242,418

(22) Filed: Jan. 8, 2019

(65) Prior Publication Data

US 2019/0146162 A1 May 16, 2019

Related U.S. Application Data

(63) Continuation of application No. 15/251,342, filed on Aug. 30, 2016, now Pat. No. 10,228,520.

(51) Int. Cl.
*G02B 6/38* (2006.01)
*G02B 6/30* (2006.01)
(Continued)

(52) U.S. Cl.
CPC ............ *G02B 6/3882* (2013.01); *G02B 6/30* (2013.01); *G02B 6/32* (2013.01); *G02B 6/4204* (2013.01);
(Continued)

(58) Field of Classification Search
CPC ........... G02B 6/30; G02B 6/32; G02B 6/3882
See application file for complete search history.

(56) References Cited

U.S. PATENT DOCUMENTS 5,214,730 A 5/1993 Nagasawa et al.
5,241,612 A 8/1993 Iwama
(Continued)

FOREIGN PATENT DOCUMENTS

AU 2002301758 A1 6/2003
CN 1136466 C 1/2004
(Continued)

OTHER PUBLICATIONS

International Search Report and Written Opinion PCT/US2017/048159 dated Nov. 17, 2017.

*Primary Examiner* — Daniel Petkovsek
(74) *Attorney, Agent, or Firm* — Adam R. Weeks

(57) ABSTRACT

An optical interface device for a photonic integrated system includes a plug and a receptacle. The receptacle is operably arranged on a PIC that supports waveguides. The plug operably supports optical fibers. The receptacle and plug are configured to operably engage to establish optical communication between the optical fibers and the waveguides. A tab on the receptacle is configured to constrain longitudinal motion while allowing for lateral motion of the receptacle to adjust its position relative to the PIC to optimize alignment. The plug can include a spacer sized to fit within a recess defined by the tab to further facilitate alignment. The plug can also include lenses to establish the optical communication between the optical fibers and the waveguides. The receptacle and plug can be engaged and disengaged in a manner similar to conventional electrical connectors.

23 Claims, 16 Drawing Sheets

(51) Int. Cl.
*G02B 6/32* (2006.01)
*G02B 6/42* (2006.01)

(52) U.S. Cl.
CPC .......... *G02B 6/4292* (2013.01); *G02B 6/3847* (2013.01); *G02B 6/3853* (2013.01); *G02B 6/3885* (2013.01)

(56) References Cited

U.S. PATENT DOCUMENTS

| | | | |
|---|---|---|---|
| 5,254,014 A | 10/1993 | Yagi et al. | |
| 5,359,686 A | 10/1994 | Galloway et al. | |
| 5,481,632 A | 1/1996 | Hirai et al. | |
| 5,611,013 A | 3/1997 | Curzio | |
| 5,960,141 A | 9/1999 | Sasaki et al. | |
| 6,012,852 A | 1/2000 | Kadar-Kallen et al. | |
| 6,227,722 B1 | 5/2001 | Kropp | |
| 6,250,820 B1 | 6/2001 | Melchior et al. | |
| 6,257,769 B1 | 7/2001 | Watanabe et al. | |
| 6,416,236 B1 | 7/2002 | Childers et al. | |
| 6,485,192 B1 | 11/2002 | Plotts et al. | |
| 6,565,262 B2 | 5/2003 | Childers et al. | |
| 6,767,199 B2 | 7/2004 | Dean et al. | |
| 6,939,057 B2 | 9/2005 | Beier et al. | |
| 6,964,527 B2 | 11/2005 | Sasaki et al. | |
| H002141 H | 1/2006 | Kevern et al. | |
| 7,050,678 B1 | 5/2006 | Isono et al. | |
| 7,177,504 B2 | 2/2007 | Towle et al. | |
| 7,292,756 B2 | 11/2007 | Moynihan | |
| 7,295,743 B2 | 11/2007 | Yatsuda et al. | |
| 7,377,699 B2 | 5/2008 | Terakura | |
| 8,016,491 B2 | 9/2011 | Takaoka et al. | |
| 8,109,679 B2 | 2/2012 | Danley et al. | |
| 8,821,040 B2 | 9/2014 | Bowen | |
| 9,008,475 B2 * | 4/2015 | Lin ................... | G02B 6/322 385/33 |
| 9,128,248 B2 | 9/2015 | Lam et al. | |
| 9,465,170 B1 | 10/2016 | Childers et al. | |
| 9,645,318 B2 * | 5/2017 | Moriyama ............. | G02B 6/322 |
| 9,645,319 B2 * | 5/2017 | Akabane ................ | G02B 6/322 |
| 2005/0249465 A1 | 11/2005 | Kevern et al. | |
| 2006/0024012 A1 * | 2/2006 | Yatsuda ................ | G02B 6/138 385/129 |
| 2011/0222823 A1 | 9/2011 | Pitwon | |
| 2012/0027353 A1 | 2/2012 | Lin | |
| 2014/0093207 A1 | 4/2014 | Hofrichter et al. | |
| 2014/0147078 A1 | 5/2014 | Bhagavatula et al. | |
| 2014/0153875 A1 | 6/2014 | Bradley et al. | |
| 2014/0219612 A1 | 8/2014 | Butler et al. | |
| 2014/0270626 A1 * | 9/2014 | Isenhour ............... | G02B 6/122 385/14 |
| 2014/0301700 A1 | 10/2014 | Matsubara et al. | |
| 2014/0321814 A1 * | 10/2014 | Chen ...................... | G02B 6/32 385/79 |
| 2015/0104135 A1 * | 4/2015 | Bushnell ............... | G02B 6/3885 385/79 |
| 2015/0316731 A1 | 11/2015 | Takahashi et al. | |
| 2015/0378108 A1 * | 12/2015 | Kuznia ................ | G02B 6/3849 385/60 |
| 2016/0216459 A1 | 7/2016 | Matsubara et al. | |
| 2016/0231513 A1 | 8/2016 | Butler et al. | |
| 2016/0238789 A1 | 8/2016 | Lagziel et al. | |
| 2017/0160486 A1 | 6/2017 | Krawczyk et al. | |
| 2017/0184800 A1 | 6/2017 | de Jong et al. | |
| 2018/0059330 A1 | 3/2018 | Evans | |

FOREIGN PATENT DOCUMENTS

| | | | |
|---|---|---|---|
| EP | 637765 B1 | 12/1998 | |
| EP | 644442 81 | 6/2000 | |
| EP | 1260841 A1 | 11/2002 | |
| JP | 04324406 A | 11/1992 | |
| JP | 08248269 A | 9/1996 | |
| JP | 11287927 A | 10/1999 | |
| JP | 04168895 B2 | 10/2008 | |
| JP | 2017203897 A * | 11/2017 | ............... G02B 6/38 |

* cited by examiner

FIBER-TO-WAVEGUIDE OPTICAL INTERFACE DEVICES AND COUPLING DEVICES WITH LENSES FOR PHOTONIC SYSTEMS

CROSS-REFERENCE TO RELATED APPLICATIONS

The present specification is a continuation of U.S. patent application Ser. No. 15/251,342 filed on Aug. 30, 2016, now U.S. Pat. No. 10,228,520 B2, and entitled "FIBER-TO-WAVEGUIDE OPTICAL INTERFACE DEVICES AND COUPLING DEVICES WITH LENSES FOR PHOTONIC SYSTEMS," which is incorporated by reference herein in its entirety.

FIELD

The present disclosure relates to integrated photonics, and in particular relates to a fiber-to-waveguide optical interface devices and coupling devices with lenses for photonic systems.

BACKGROUND

Photonic systems are presently used in a variety of applications and devices to communicate information using light (optical) signals. Photonic systems typically include photonic integrated circuits (PICs), which are analogous to electronic integrated circuits in that they integrate multiple components into a single material where those components operate using light only or a combination of light and electricity. A typical PIC has a combination of electrical and optical functionality, and can include light transmitters (light sources) and light receivers (photodetectors), as well as electrical wiring and like components that serve to generate and carry electrical signals for conversion to optical signals and vice versa.

A PIC includes one or more optical waveguides that carry light in analogy to the way metal wires carry electricity in electronic integrated circuits. Just as the electricity traveling in the wires of an electronic integrated circuit carries electrical signals, the light traveling in the waveguides of a PIC carries optical signals.

To transmit the optical signals from the PIC to a remote device, the optical signals carried by a waveguide in the PIC need to be transferred or "optically coupled" to a corresponding optical fiber connected to the remote device. Coupling light from a planar waveguide to an optical fiber is achieved either through the surface of the PIC via surface corrugated gratings or via embedded total internal reflection mirrors, or from the edge via proximity coupling or edge coupling, also referred to as "butt coupling."

Current edge coupling techniques involve forming a permanent bond between the optical fibers and the waveguides. Thus, there is an unresolved need for improved edge coupling.

SUMMARY

An aspect of the disclosure is a coupling device for an optical interface device for a PIC assembly that includes: a body having a front end, a back end and a lower surface; at least one alignment feature at the front end of the body; at least one bore that runs from the back end and either through to the front end or that terminates adjacent the front end, the at least one bore sized to accommodate at least one optical fiber; and at least one lens at the front end and operably aligned with the at least one bore.

Another aspect of the disclosure is an optical interface device that includes the coupling device described above, wherein the coupling device defines a first coupling device and operably supports at least one optical fiber in the at least one bore; a PIC assembly having a PIC that supports at least one waveguide having an end face and having a second coupling device operably arranged with the PIC and having a front end; and wherein the first and second coupling devices are configured to operably engage so that the at least one waveguide supported by the PIC is in optical communication with the at least one optical fiber of the first coupling device through the at least one lens on the front end of the first coupling device.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the description below, longitudinal or axial movement is in the z-direction while lateral movement is in the x-direction and/or the y-direction.

Photonic System and PIC Assembly

Figure 1:
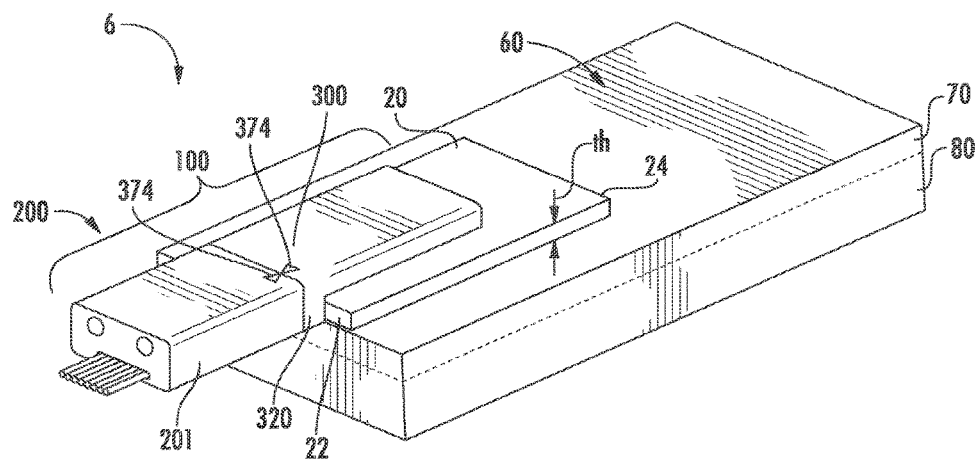
FIG. 1 is an elevated view of an example photonic system that includes a PIC assembly and an optical interface device that has a first coupling device in the form of a plug and a second coupling device in the form of a receptacle.
Figure 2A:
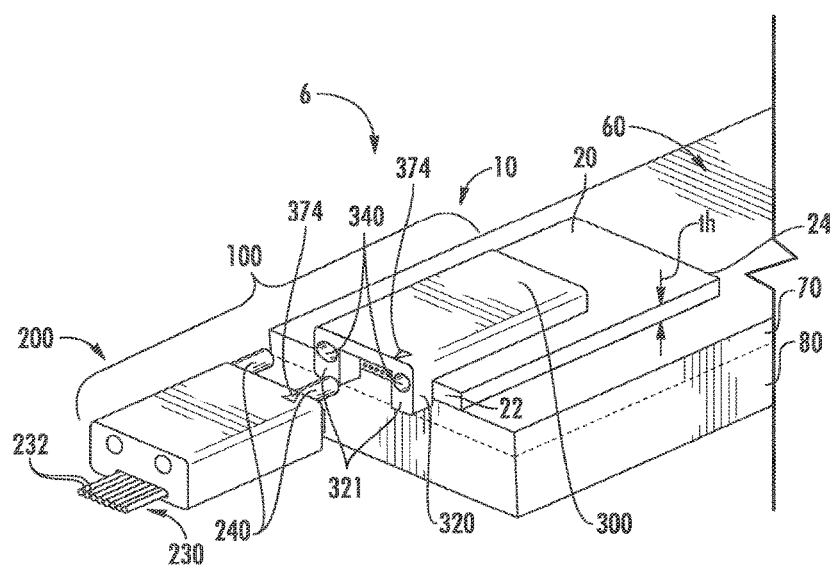
FIG. 2A is a partially exploded view of the example photonic system of FIG. 1, wherein the plug is disconnected from the receptacle.
Figure 2B:
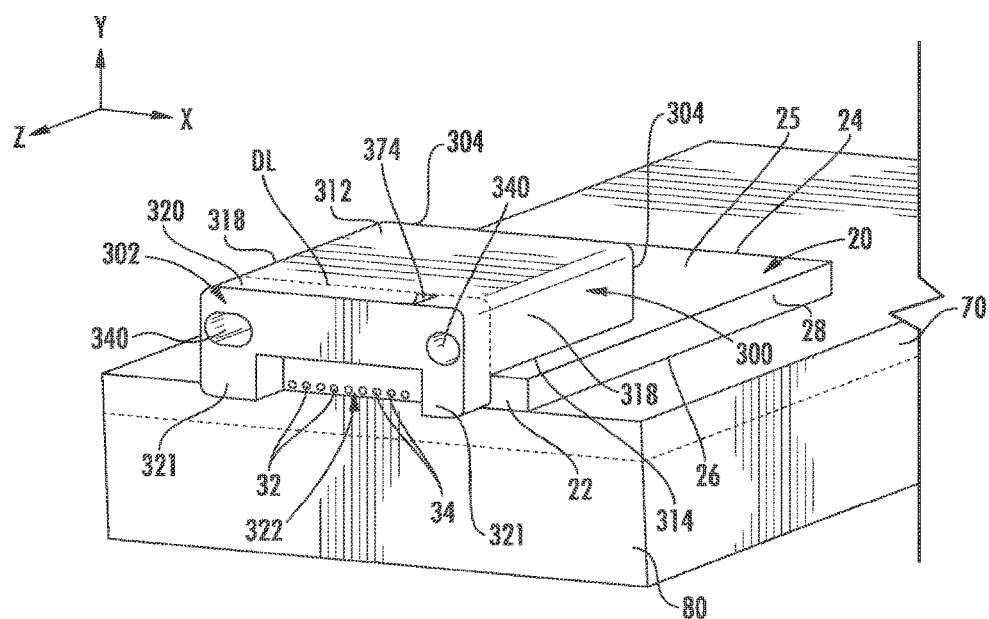
FIG. 2B is a close-up front elevated view of the PIC assembly of the photonic system of FIGS. 1 and 2A.

FIG. 1 is an elevated view of an example photonic system 6, while FIG. 2A is an elevated and partially exploded view of the photonic system of FIG. 1. FIG. 2B is a close-up elevated view of the receptacle portion of the photonic system 6. The photonic system 6 includes a PIC assembly 10. The PIC assembly 10 includes a PIC 20 and a substrate 60 that operably supports the PIC. In an example, substrate 60 includes an interposer 70 and a printed circuit board 80, in which case PIC 20 is operably mounted to the interposer 70, which is operably mounted to the PCB 80. The interposer 70 is configured to provide electrical connections between PIC 20 and PCB 80. The interposer 70 can be made of a variety of different materials, including glass or silicon.

The photonic system 6 also includes an optical interface device 100 which includes a first coupling device 200 and a second coupling device 300, wherein the first and second coupling devices are configured to operably engage and disengage. The first coupling device 200 is shown in FIG. 2A in the form of a plug while the second coupling device 300 is shown in FIGS. 2A and 2B as being in the form of a receptacle operably arranged on PIC 20. In other embodiments, the first coupling device 200 can be in the form of a plug and the second coupling device 300 can be in the form of a receptacle. In the discussion below, first coupling device 200 is referred to as a plug while the second coupling device 300 is referred to as a receptacle for ease of discussion.

In an example, the plug 200 and receptacle 300 are maintained in an operably engaged configuration using any one of a number of latch mechanisms (not shown) known in the art for connectors, such as disclosed in U.S. Pat. Nos. 6,565,262 and 7,377,699 and 5,254,014, which are all incorporated by reference herein in their entirety.

The main components of photonic system 6 and the optical interface device 100 are now discussed in greater detail below.

Example Plug

Figure 3A:
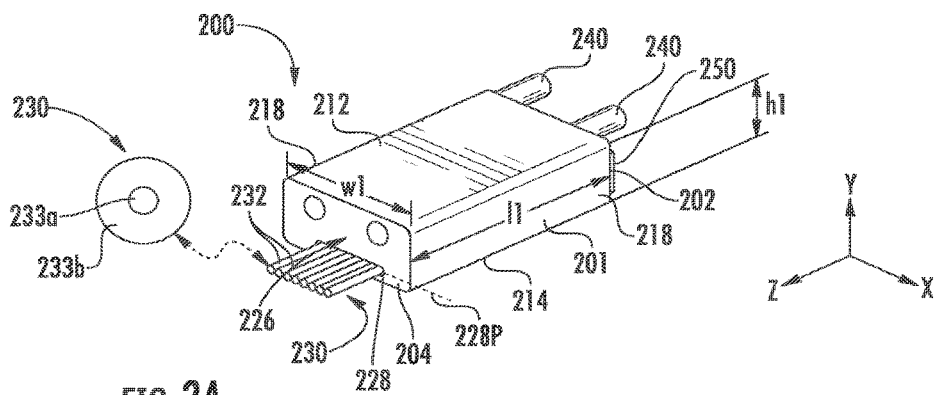
FIG. 3A is an elevated view of an example plug of the optical interface device shown in FIGS. 1, 2A and 2B.
Figure 3B:
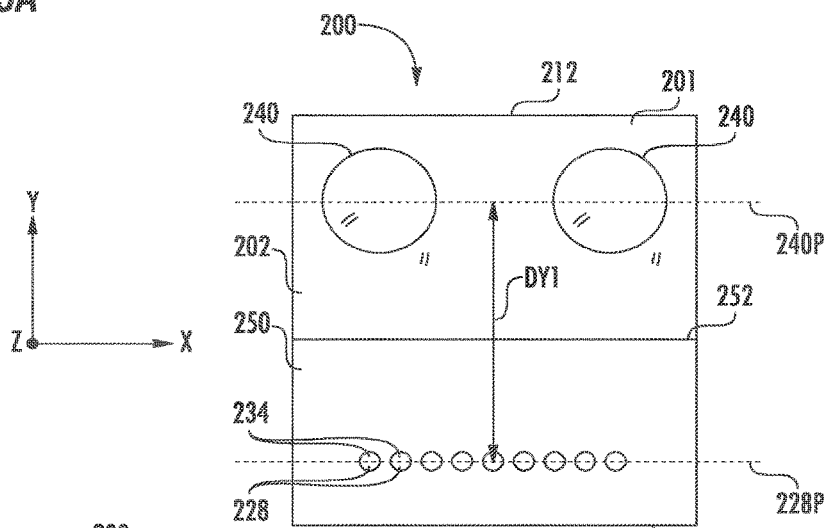
FIG. 3B is a front on view of an example plug of the optical interface device shown in FIGS. 1, 2A and 2B.
Figure 3C:
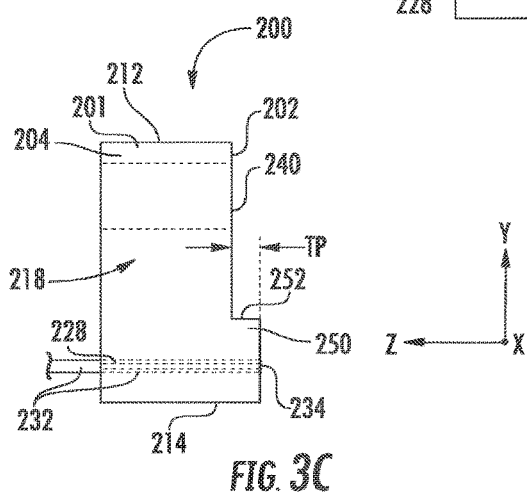
FIG. 3C is a side view of an example plug of the optical interface device shown in FIGS. 1 and 2 and illustrates an example wherein the ferrule body of the plug includes an integrally formed spacer with an upward-facing ledge.

FIG. 3A is an elevated view, FIG. 3B is a front on view and FIG. 3C is an example side view of plug 200. Plug 200 includes a ferrule body ("ferrule") 201 having a front side or front end 202, a back side or back end 204, upper and lower surfaces 212 and 214, a central portion 216, and opposite edges (sides) 218. In an example, ferrule 201 is monolithic. The plug 100 operably supports an array 230 of optical fibers 232 each having core 233a, a cladding 233b surrounding the core (see close-up inset in FIG. 3A). Each optical fiber 232 has an end face 234. In an example, the array 230 of optical fiber 232 runs through a single elongate bore 228 as shown in FIG. 3A. In another example, each optical fiber 232 runs through respective bores 228, as shown in FIG. 3B. More generally, ferrule 201 includes one or more bores 228. The one or more bores are formed in central portion 226 of ferrule 201 and reside in an x-z bore plane 228P. In an example where each fiber 232 runs through a respective bore 228, each of the bores has a circular cross-sectional shape that is slightly larger than the diameter of the fiber. In an example, end faces 234 of fibers 232 are substantially co-planar with front end 202. The optical fibers 232 in array 230 define a pitch $p_F$. Example optical fibers 232 have a diameter of either 80 microns or 125 microns. Other diameters for fibers 232 can also be employed.

The plug 200 also includes at least one alignment feature 240. In an example, two spaced apart alignment features 240 are employed. In an example, alignment feature 240 resides adjacent upper surface 212 and above bore plane 228, as shown in FIG. 3A. In examples, alignment feature 240 is in form of an alignment pin (to define the plug configuration, as shown) or an alignment hole (to define a receptacle configuration). By way of example, the discussion below refers to an embodiment having two spaced apart alignment features 240 in the form of alignment pins that reside in an x-z alignment-feature plane 240P (see FIG. 3B). The y-distance between alignment feature plane 240P and bore plane 228P is denoted DY1. As shown in FIG. 3A, plug 200 has an overall height dimension h1, an overall length dimension l1 and an overall width dimension w1.

The array 230 of optical fibers 232 of plug 200 is configured to optically couple to the array of waveguides supported by PIC 20 of PIC assembly 10 when plug 100 is operably coupled to receptacle 300 of the PIC assembly, as explained below. Thus, in an example, the optical fiber pitch $p_F$ is equal to the waveguide pitch $p_W$, and the number optical fibers 232 is equal to the number PIC assembly waveguides.

The side view of FIG. 3C shows an example wherein ferrule 201 includes a protrusion or "spacer" 250 that extends from front end 202 adjacent lower surface 214 and that defines an upward facing ledge 252. The spacer 250 facilitates the mechanical engagement, including the alignment and spacing of plug 200 relative to receptacle 300, as described below. The spacer 250 has a thickness TP as measured in the z-direction relative to front end 202. As spacer 250 is associated with plug 200, it is referred to hereinafter as plug spacer 250.

Figure 3D:
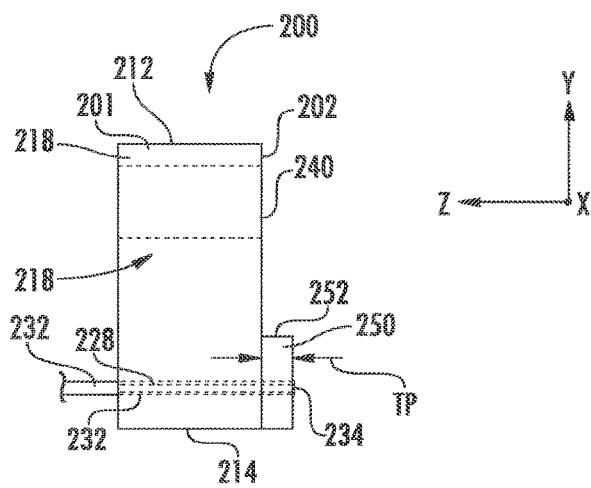
FIG. 3D is similar to FIG. 3D and shows an example of a spacer formed as a separate piece from the ferrule body of the plug.

In an example, plug spacer 250 can be formed as part of a monolithic ferrule 201, such as shown in FIG. 3C. In another example, plug spacer 250 can be formed as one or more separate parts (i.e., one or more separate pieces) added to the front end 202 of the ferrule 201, as illustrated in FIG. 3D. The plug spacer need not extend all the way between sides 218 of ferrule 201.

PIC Assembly

Figure 4A:
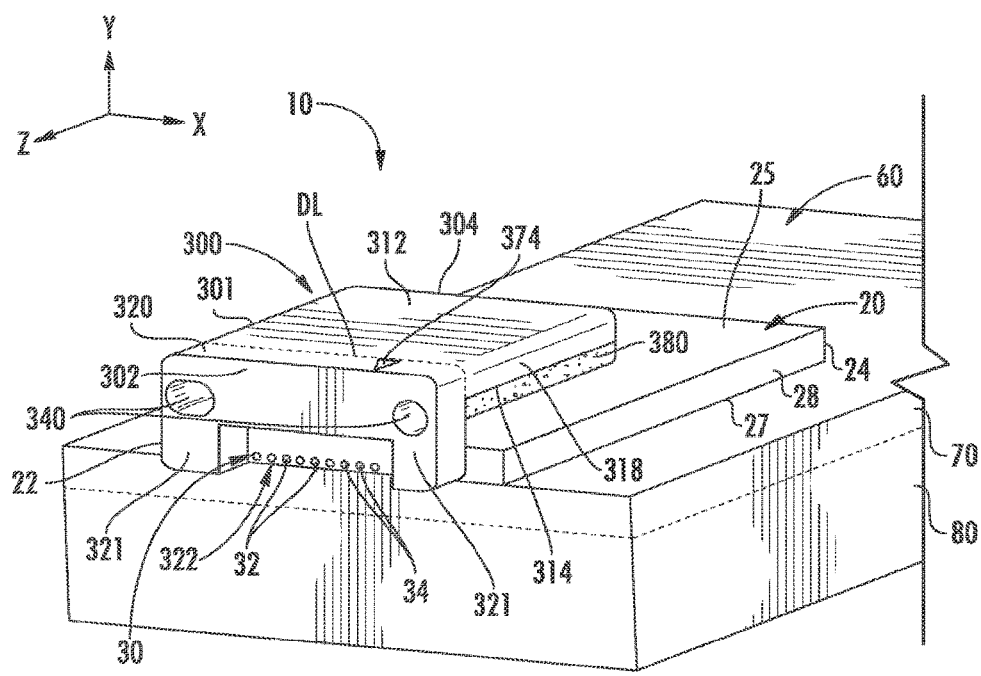
FIG. 4A is front elevated view of an example PIC assembly similar to FIG. 2B and showing an example configuration of a receptacle, PIC, interposer and printed circuit board, wherein the z-motion of the receptacle relative to the PIC is constrained by the tab sections.
Figure 4B:
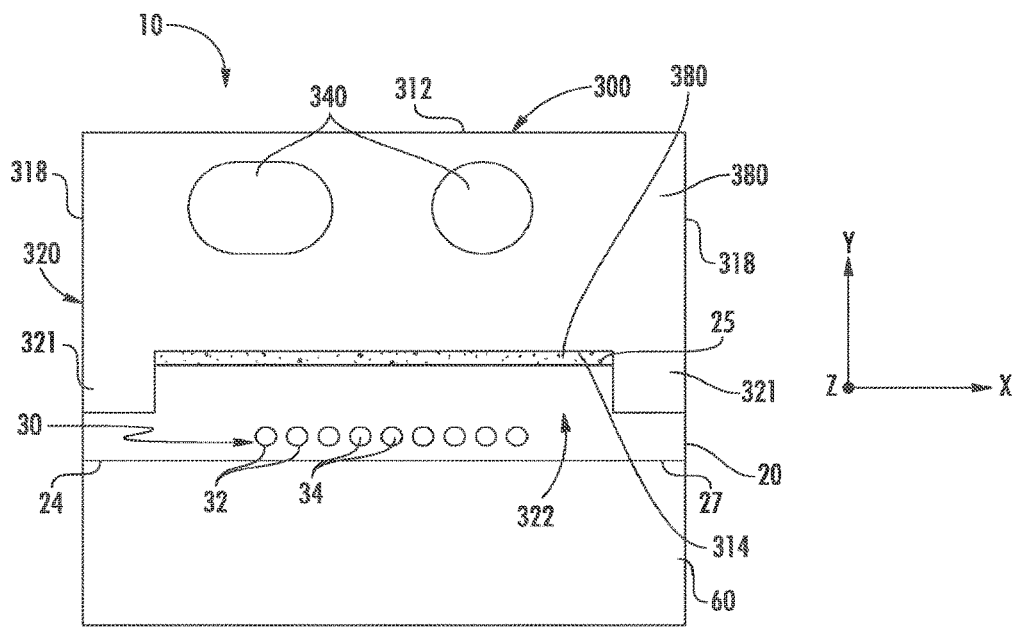
FIGS. 4B through 4D are front-on views of example PIC assemblies showing three different example configurations of the receptacle tab.
Figure 4C:
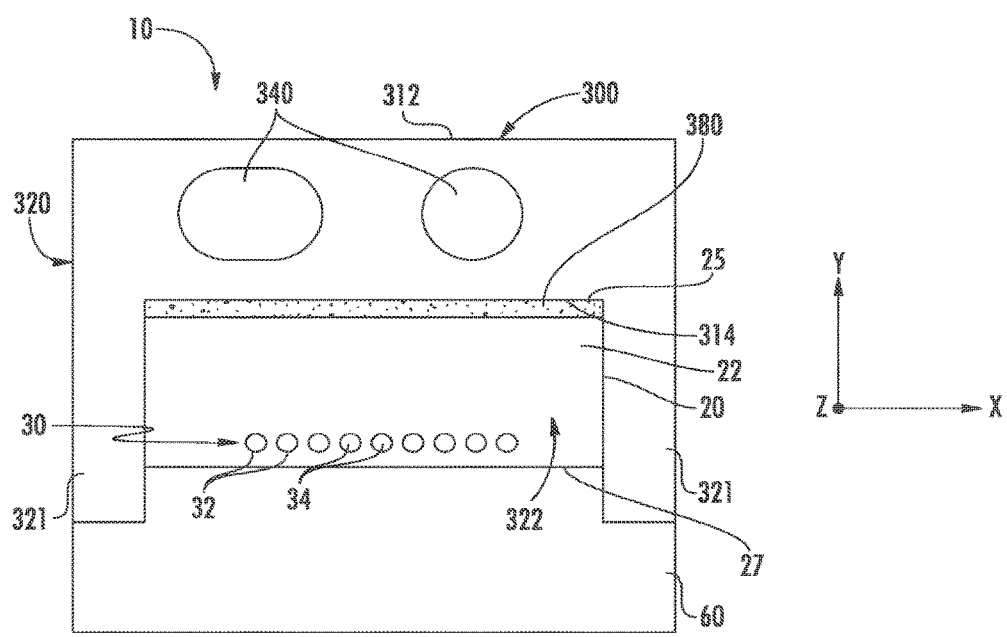
Figure 4D:
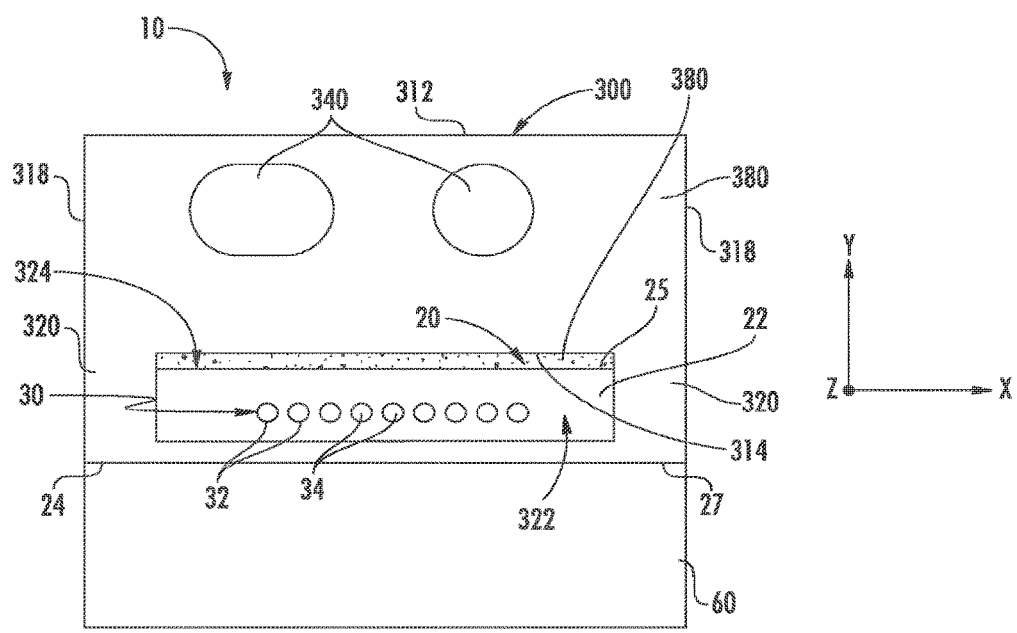

FIG. 4A is a front elevated view of an example PIC assembly 10, and FIGS. 4B through 4D are front-on views of two different example configurations of the PIC assembly. As noted above, PIC assembly 10 includes PIC 20, which has front and back ends 22 and 24, opposite upper and lower surfaces 25 and 27, and opposite sides 28. The PIC 20 can be formed from silicon, indium phosphide or glass.

The PIC 20 supports an array 30 of optical waveguides ("waveguides") 32 that run longitudinally in the z-direction down a center portion of the PIC. Each waveguide 32 has an end face 34 that terminates substantially at front end 22. In an example, end faces 34 terminate near lower surface 27, as shown in FIG. 1. In other examples, end faces 34 terminate near upper surface 25. Generally, end faces 34 terminate anywhere between upper surface 25 and lower surface 27. In an example, waveguides 32 are made of glass. In another example, the waveguides 32 are made of silicon. In an example, waveguides 32 comprise channel waveguides. Also in an example, waveguides 32 are single mode. The array 30 of waveguides 32 has the aforementioned waveguide pitch $p_W$.

The PIC 20 can also include other components that are not shown, such as lasers, photodetectors, metal wiring, optical redirecting elements, electrical processing circuitry, optical processing circuitry, contact pads, etc., as is known in the art. In an example, PIC 20 is formed mainly from silicon (i.e., is silicon-based) and constitutes a silicon photonics (SiP) device. In another example, PIC 20 is formed mainly from glass, (i.e., is glass-based) and constitutes a passive planar lightwave circuit. The PIC 20 can also be formed from other semiconductor materials known in the art. The PIC 20 can function a direct-detection or coherent-detection transceiver, a splitter, a fan-out, a tap coupler, a multiplexer/demultiplexer, a laser array, etc.

Example Receptacles

As noted above, PIC assembly 10 supports receptacle 300 operably arranged relative to PIC 20. In an example, receptacle 300 has a coefficient of thermal expansion (CTE) close to the PIC material (e.g., within 50% or within 20% or within 10%) so that there is little movement or stress build-up between the receptacle and PIC 20 during high temperature operation. In an example, receptacle 300 can be secured to PIC 20 using a suitable securing material, such as an epoxy or like bonding adhesive, as explained in greater detail below.

With reference again to FIGS. 4A through 4D, the receptacle body 301 has a front end 302, a back end 304, an upper surface 312 and a lower surface 314, a central portion 316 and opposite sides or edges 318. In examples, receptacle body 301 can be formed form a molded polymer or a glass. With reference to FIG. 8B introduced and discussed below, in an example, receptacle 300 has a generally rectangular body 301 with an overall width dimension w2, an overall length dimension l2 and an overall height dimension h2.

In an example, receptacle 300 includes at least one alignment feature 340. FIG. 4A shows an example that includes two alignment features 340 formed in front end 302. In an example, alignment feature 340 is in the form of two alignment holes configured to receive the two alignment pins 240 of plug 200. In an example such as shown in FIG. 4B, one alignment hole 340 is elongate to avoid over-constraining the mating of receptacle 300 to plug 200 in the x-direction and to allow for relative movement due to a CTE mismatch between plug 200 and receptacle 300. This example alignment configuration can be particularly useful if receptacle 300 is made from a non-compliant material, such as glass. The at least one alignment feature 340 can also be offset with respect to an axis of symmetry of the fiber array. This is beneficial in reducing the thermal movement due to thermal expansion since the distance from the axis of symmetric thermal movement is reduced. In one configuration the circular (non-elongate) alignment hole 340 is centered on array 30 of waveguides 32 of PIC 20, but other configurations are possible.

In an example, receptacle 300 includes at front end 302 a tab 320 that in an example includes at least one downwardly depending tab section 321 that extends beyond lower surface 314. In an example, tab 320 defines a recess 322 configured to accommodate spacer 250 of plug 200. In an example, tab 320 includes at least one alignment feature 340, which further in an example can be in tab section 321. In the example configuration illustrated in FIG. 2A, tab 320 is integrally formed with (i.e., is part of) a monolithic receptacle body 301, with tab sections 321 downwardly depending to cover at least a portion of front end 22 of PIC 20. In another example best seen in FIG. 2B, tab 320 is formed as a single, separate part as illustrated by the dashed line DL in FIG. 2B. The tab 320 can also be formed as two separate parts that each define a separate tab section 321, as discussed below in connection with FIGS. 9A and 9B. In the example discussed below, tab 320 has a U-shape defined by two tab sections 321 and recess 322.

In FIG. 4B, tab 320 is configures so that the two tab sections 321 extend into corresponding recesses 26 in upper surface 26 of PIC 20 and can be used to perform alignment of receptacle 300 with respect to the underlying PIC. The tabs 320 can be configured to form a recess 322 between lower surface 314 and upper surface 25 of PIC20. In FIG. 4C, tab sections 320 are configured to extend into substrate 60. In an example, tab sections 320 are configured to extend onto the front surface of substrate 60. In an example, a layer of securing material 380 such as an epoxy can be employed to secure receptacle body 301 to underlying PIC 20.

FIG. 4D is similar to FIGS. 4B and 4C and shows an example where tab 320 is formed such that the recess 322 is in the form of an aperture sized to accommodate spacer 250 of plug 200.

With reference again to FIG. 4A, it is noted that the z-motion (i.e., axial or longitudinal motion) of receptacle 300 relative to PIC 20 is constrained by tab sections 321 that extend in front of and are in contact with front end 22 of the PIC. This allows for lateral (i.e., x and y movement of receptacle 300. The lateral movement in the y-direction (i.e., vertical movement) allows for lower surface 314 of the body 301 of receptacle 300 to be spaced apart from the PIC top surface 25 in the y-direction by an amount selected to optimize alignment between the at least one waveguide 32 of PIC 20 and at least one optical fiber 232 of plug 20 when forming an optical interface device. The select spacing can be fixed using for example securing material 380 disposed between PIC top surface 25 and lower surface 314 of body 301 of receptacle 300.

As discussed above in connection with FIG. 3B, the y-distance between alignment feature plane 240P and bore plane 228P is denoted DY1. The distance DY1 depends on the location of waveguides 32, which depends on thickness th of the PIC and where the waveguides are supported by the PIC, e.g., on upper surface 25, on lower surface 27, or somewhere between. Since it is desired that a single plug 200 be able to mate with different receptacles 300, in an example, the distance DY1 can be designed to be the maximum needed for any configuration of PIC 20.

As explained above, the elevation (i.e., y-position) of receptacle 300 on PIC 20 can be adjusted so that fibers 232 are aligned with waveguides 32. In an example illustrated in FIGS. 4A, 4B and 4C, the layer of securing material 380 between receptacle 300 and PIC 20 is used to fill the gap between lower surface 314 of receptacle 300 and upper surface 25 of PIC 20 and secure the receptacle to the PIC 20 when fibers 232 and waveguides 32 are aligned.

It is noted here that securing material 380 need not define the size of the gap between the lower surface 314 of receptacle 300 and the upper surface 25 of PIC 20 when fibers 232 and waveguides 32 are aligned. In an example, receptacle 300 is engaged with plug 200 and is then adjusted in the x-y plane to align waveguides 32 and fibers 232 while tab section 320 constrains motion in the z-direction. This alignment adjustment creates the gap. There is no z-movement because tab sections 320 restriction z-direction movement. The restriction of z-movement by tab 329 is an advantage since simplifies fiber-to-waveguide alignment to movement in just the x and y directions.

Additional Receptacle Tab and Plug Spacer Configurations

Figure 5:
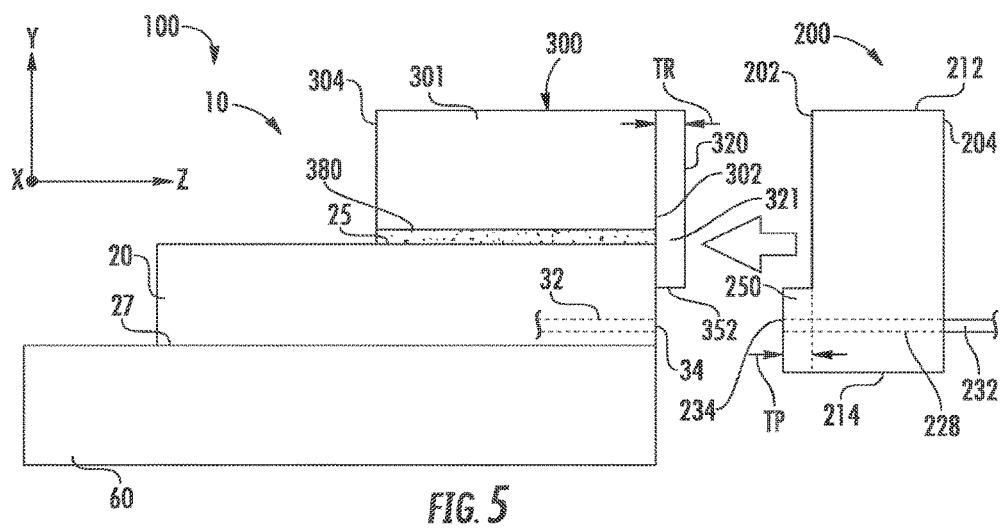
FIG. 5 is a partially exploded side view of an example optical interface device showing an example configuration wherein the plug and receptacle respectively include complementary spacers.

FIG. 5 is a partially exploded side view of optical interface device 100 that shows an example configuration wherein tab 320 defines a downward facing ledge 352. The tab 320 is shown by way of example as a separate part that is added to the front end 302 of body 301 of receptacle 300. The plug 200 includes the aforementioned plug spacer 250 with upward facing ledge 252. The downward facing ledge 352 of tab 320 is configured to make contact with upward facing ledge 252 of plug spacer 250 when plug 200 and receptacle 300 are operably engaged. The downward facing ledge 352 along with tab sections 321 of tab 320 aid in alignment of optical fibers 232 of plug 200 to waveguides 32 of PIC 20 by restricting movement of the plug when the plug is engaged with receptacle 300. It also allows receptacle 300 to be moved in the vertical direction (i.e., y-direction) to enable optical fibers 232 and waveguides 32 to be optimally aligned. The tab 320 has a thickness TR as measured in the z-direction. The tab 320 can be considered a counterpart to the receptacle spacer and could also be referred to as a "receptacle spacer."

Figure 6A:
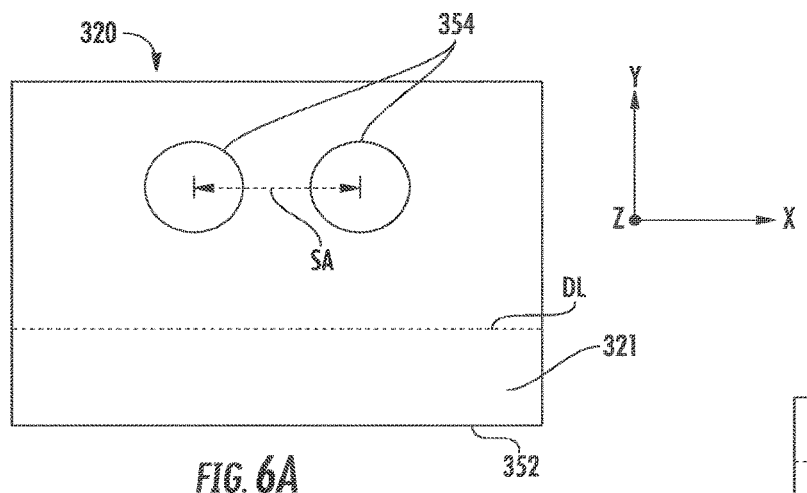
FIG. 6A is a front on view and FIG. 6B is a side view of an example tab that is added to the front end of the receptacle body.
Figure 6B:
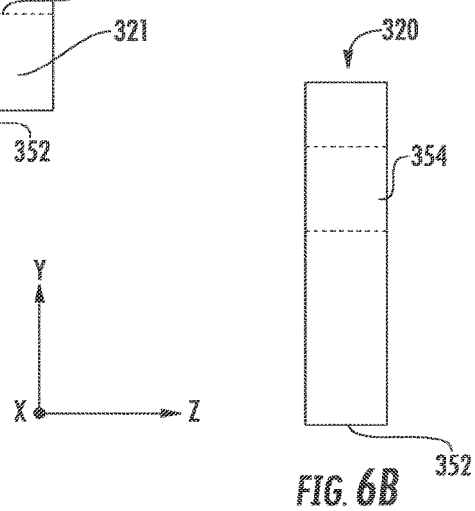

In an example where tab 320 is a separate component added to receptacle body 301, it can be fabricated from fusion glass. FIG. 6A is a front-on view and FIG. 6B is a side view of an example tab 320 in the form of a plate that can be attached to front end 302 of receptacle body 301. The dashed line DL in FIG. 6A schematically illustrates where tab section 321 begins, i.e., where tab 320 would extend to cover front end 22 of PIC 22, as shown in FIG. 5.

The tab 320 can include one or more holes 354 that align with one or more alignment features 340 formed in receptacle front end 302. The holes 354 need not have the exact same diameter as alignment features 340 and in an example are slightly larger to provide clearance for alignment features (e.g., alignment pins) 340 of plug 300.

Figure 7A:
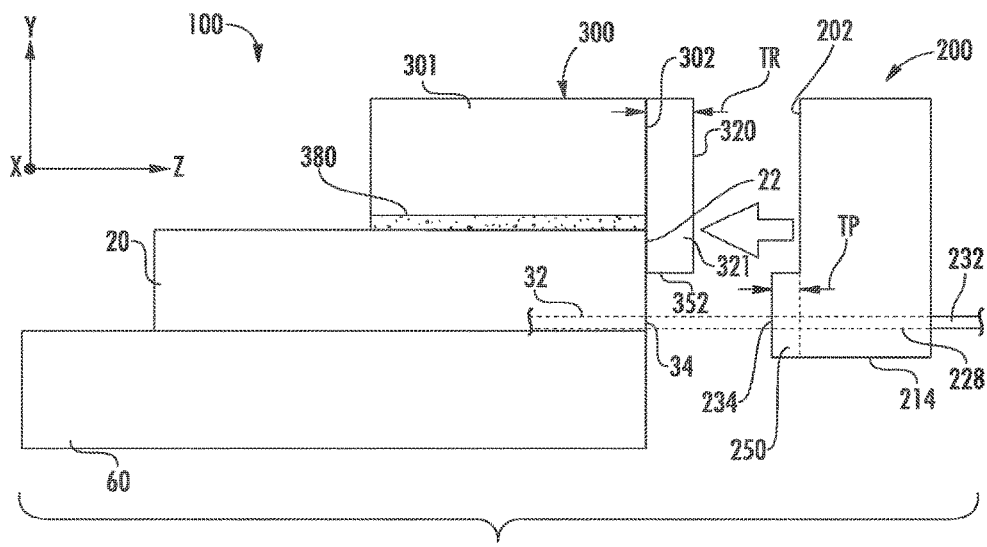
FIG. 7A is similar to FIG. 6A, except that the thickness of the tab is greater than the thickness of the plug spacer in order to provide a select spacing between the end faces of the optical fibers of the plug and the waveguides of the PIC.
Figure 7B:
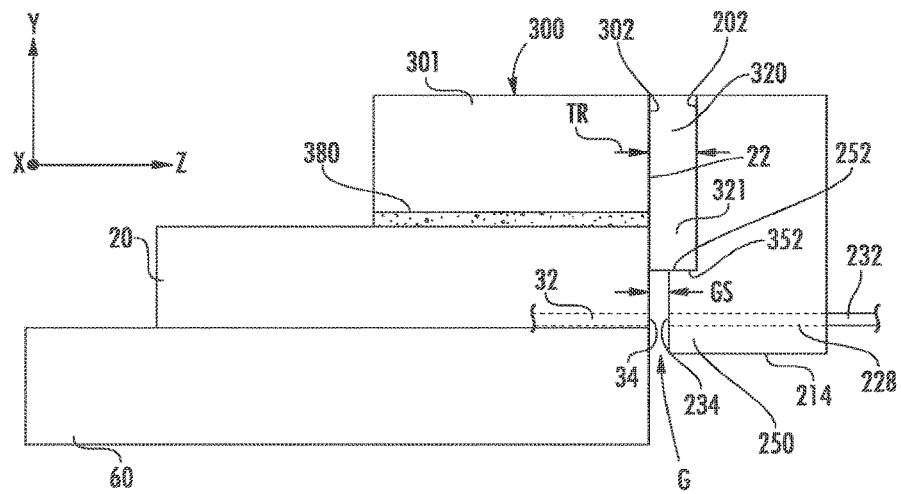
FIG. 7B shows the plug and receptacle of FIG. 7A operably engaged.

FIGS. 7A and 7B are similar to FIG. 5 and illustrate the use of plug spacer 250 and tab 320 to define a gap G with a gap spacing GS between waveguide end faces 34 and optical fiber end faces 134 when the plug 200 and receptacle 300 are operably engaged. In an example, this is accomplished by making the thickness TR of tab 320 greater than the thickness TP of plug spacer 250, i.e., TR>TP.

Figure 7C:
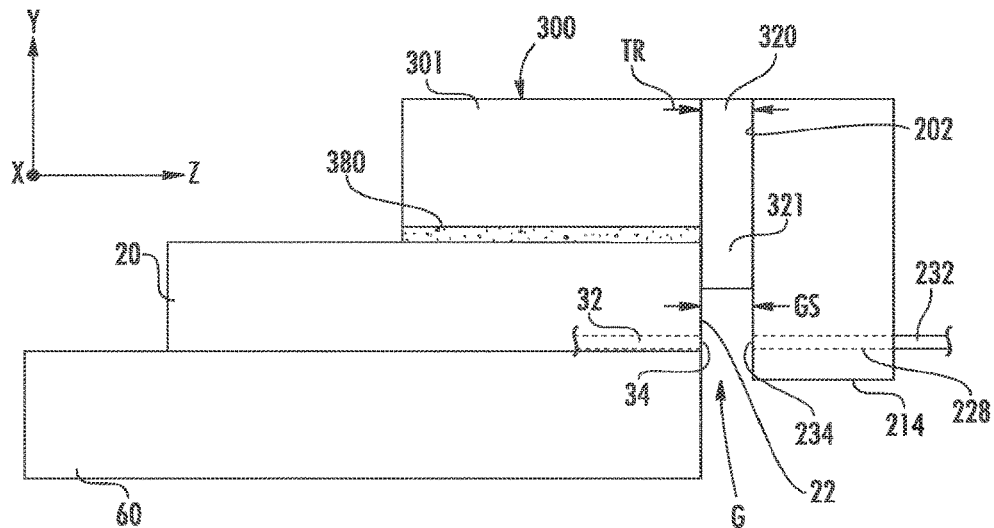
FIG. 7C is similar to FIG. 7A and illustrates an example wherein the front end of the plug is flat.

In an example, the gap spacing GS is in the range 0<GS<2.1 mm. In another example, the gap spacing GS is either in the range 0<GS<65 microns or 270 microns<GS<2100 microns. In another example, the gap spacing GS is within (i.e., less than) the Rayleigh range of a Gaussian beam propagating between each waveguide end face 34 and opposing optical fiber end face 134. FIG. 7C is similar to FIG. 7A and illustrates an example wherein the front end 202 of ferrule 201 of plug 200 is flat, there is no plug spacer 250 so that TP=0.

To avoid physical contact and possible damage to the waveguide end faces 34 and the fiber end faces 134 while still allowing for direct end-face coupling, gap G can have a minimal gap distance GS, e.g., 0<GS<65 microns (e.g., 5 microns). For relatively small gap spacings GS, an index matching gel can be placed in the gap to avoid loss from Fresnel reflection. To expand the (Gaussian) optical beam that travels between waveguide end faces 34 and fiber end faces 232 and to improve the lateral misalignment tolerance and resistance to dust other microscopic debris that can obstruct the optical beam transmitted over gap G, the gap spacing GS can be in the larger end of the range, e.g., 270 microns<GS<2100 microns, or can be less than the aforementioned Rayleigh range.

Figure 7D:
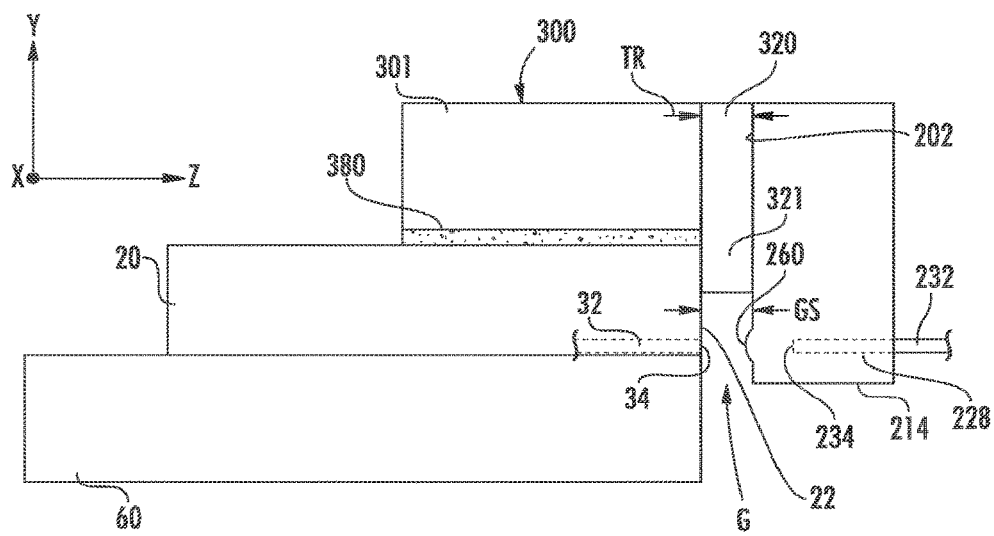
FIG. 7D is similar to FIG. 7C and illustrates an example wherein the front end of the plug includes lenses configured to optically couple light between the fibers of the plug and the waveguides of the receptacle.
Figure 7E:
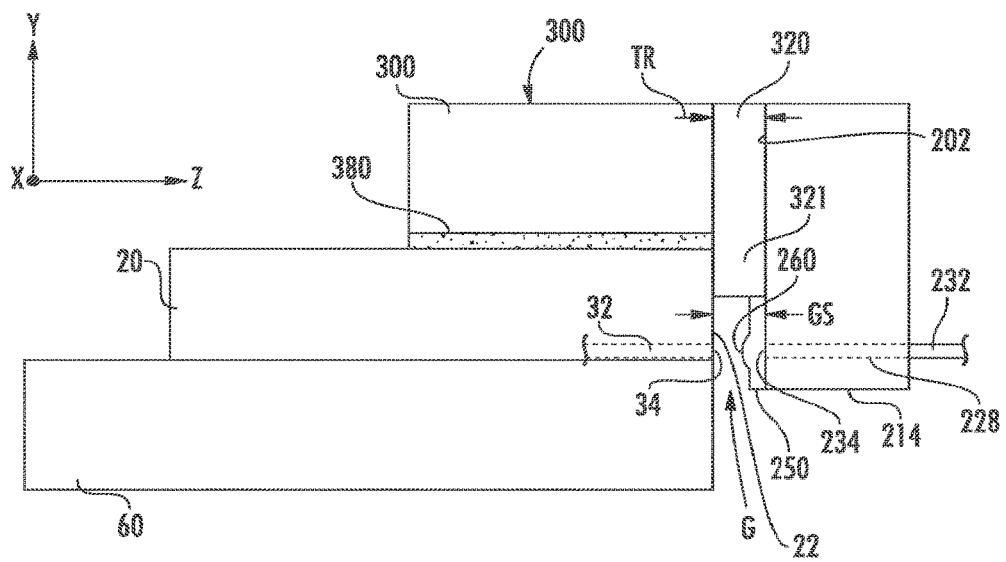
FIG. 7E is similar to FIG. 7D and illustrates an example where the front end of the plug includes a spacer that includes lenses to optically couple light between the fibers of the plug and the waveguides of the receptacle.

FIG. 7D is similar to FIG. 7C and illustrates an example wherein for a relative large gap spacing GS, front end 202 of plug 200 includes at least one lens 60 configured to optically couple light between at least one fiber 232 of plug 200 and at least one waveguides 32 of receptacle 300 across gap G. In an example, lens or lenses 60 can be gradient-index lenses, molded lenses, etc. In an example, lens or lenses 60 can be formed in a portion of ferrule 201 and the end faces of fibers 32 terminate at an end of bore 228 within the ferrule body. In an example, lens or lenses 60 can be formed to be substantially flush with front end 202 of ferrule 201. In an example, lens or lenses 60 can be formed as an integral and monolithic part of the ferrule during the ferrule-forming process (e.g., during a mold process). The lens or lenses 60 can also be added to ferrule 201 at front end 202. In an example, lens or lenses 60 can be made of a different material than ferrule 201. In an example, lens or lenses 60 can be supported by a plate or like support member such as plug spacer 250 attached to ferrule front end 202, as shown in FIG. 7E. In an example, lens or lenses 60 can be made of glass.

Figure 8A:
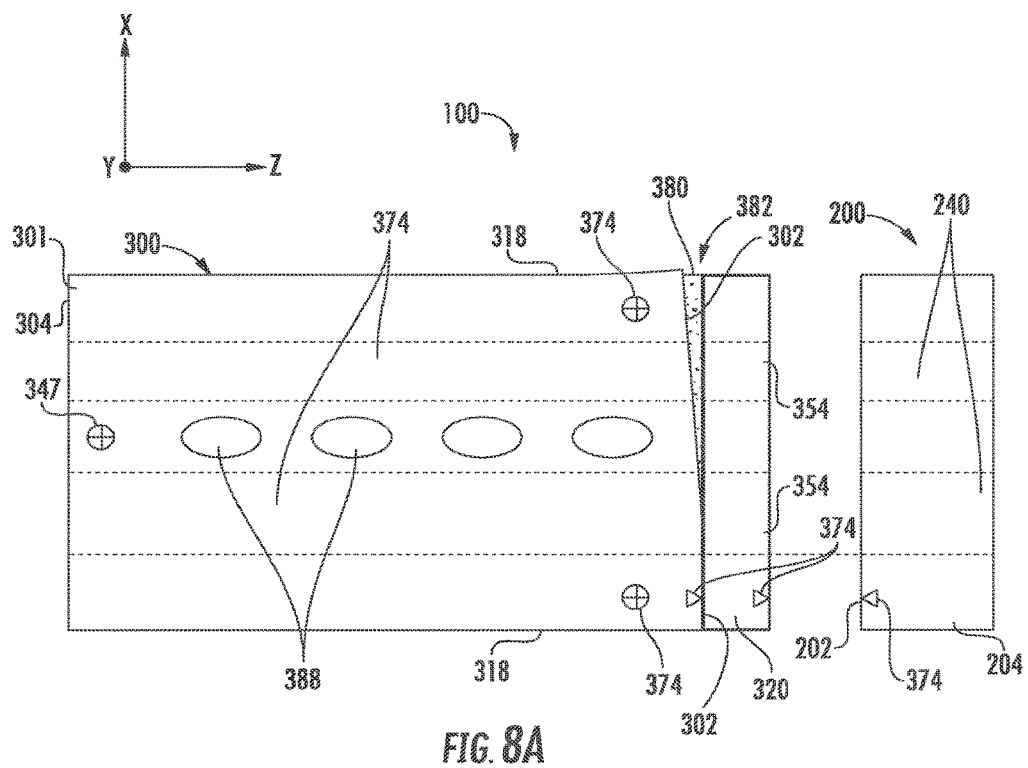
FIG. 8A is a top-down partially exploded view of an example optical interface device, illustrating how the tab can compensate for an error in the shape of the front end of the receptacle body.
Figure 8B:
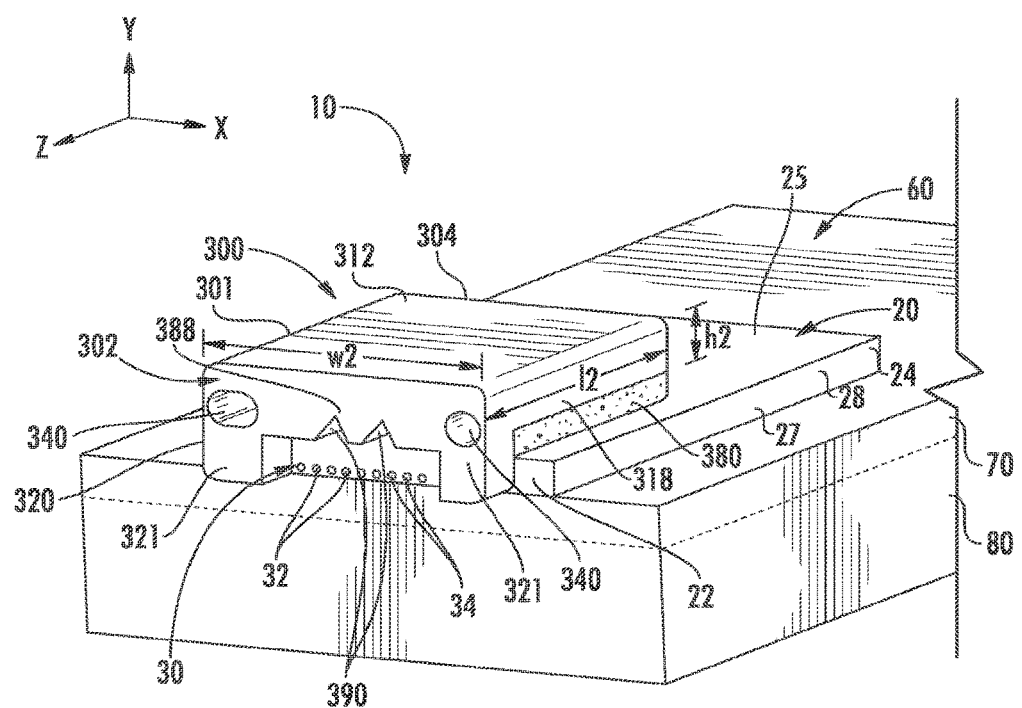
FIG. 8B is similar to FIG. 4A and illustrates an embodiment wherein the receptacle body includes one or more recesses in the lower surface to facilitate securing the receptacle to the underlying PIC.

FIG. 8A is a top-down partially exploded view of optical interface device 100 illustrating the use of tab 320 to increase the tolerance to small angular misalignments between receptacle 300 and ferrule 201 of plug 200. In an example, alignment fiducials 374 can be formed on upper surface 312 of body 301 for performing alignment of receptacle 300 and the underlying PIC 20 if the receptacle is made of a transparent material such as Ultem or glass. FIG. 1 also shows example alignment fiducials 374 on plug 200 and receptacle 300. Alignment fiducials 374 can be formed using a variety of known techniques, such as photolithographic techniques, and can have a variety of shapes, sizes and configurations known in the art.

If front end 302 of receptacle body 301 has a slight shape error relative to sides 318, then tab 320 can be arranged to compensate for this shape error. The shape error shown in FIG. 8A creates an angular misalignment. The ferrule alignment features (e.g., alignment pins) 240 can be used as a fixture to insure that tab 320 is substantially flat and parallel to the ferrule front end 202. In an example, securing material 380 is used to secure tab 320 to front end 302 of receptacle body 301. In this example, the securing material 380 can fill any gap 382 between front end 302 and the tab 320 due to the shape error.

FIG. 8A also shows an example wherein receptacle body 301 includes through holes 388 that run in the z-direction and connect the upper and lower surfaces 312 and 314. The through holes 388 can be used to insert securing material 380 (e.g., an epoxy) to secure receptacle 300 to underlying PIC 20.

FIG. 8B is similar to FIG. 4A and illustrates an embodiment wherein receptacle body 301 includes one or more recesses 390 in lower surface 314. The one or more recesses 390 can serve as a reservoir for securing material 380 when securing receptacle 300 to upper surface 22 of PIC 20. In an example, the one or more recesses 390 can be in the form of longitudinal grooves as shown. Other shapes and orientations for the one or more recesses 390 can also be used. In other embodiments, standard microelectronics packaging techniques are used to secure receptacle 300 to PIC 20.

Figure 9A:
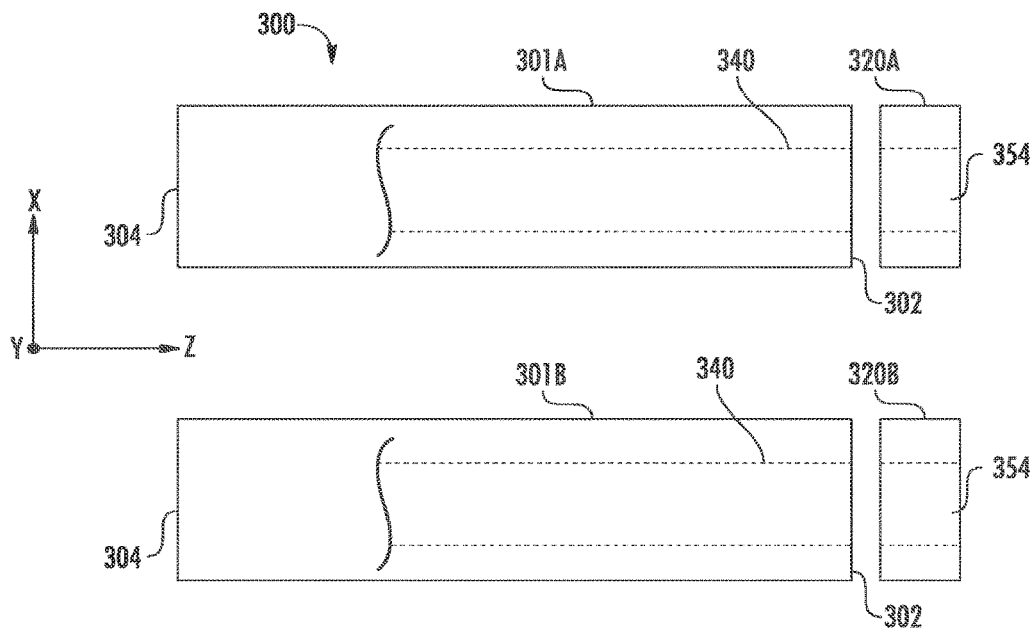
FIG. 9A is a top-down partially exploded view of an example two-part receptacle along with an example two-part tab.

FIG. 9A is a top-down partially exploded view of an example receptacle 300 wherein the receptacle body 301 is constituted by two separate parts 301A and 301B that are elongate in the z-direction. Also shown is an example tab 320 formed using two separate tab parts 320A and 320B. In another example, the separate tab parts 320A and 320B can be formed integral with receptacle body parts 301A and 301B, respectively.

Figure 9B:
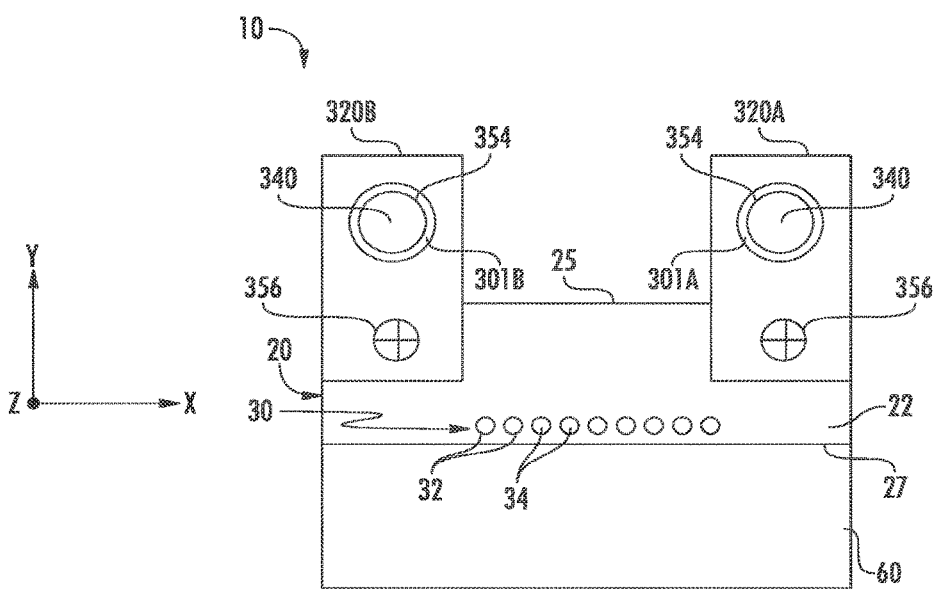
FIG. 9B is a front-on view of an example PIC assembly showing the two-part receptacle and the two-part tab.

FIG. 9B is a front-on view of an example PIC assembly 20 that utilizes the example two-part receptacle 300 and two tab parts 320A and 320B of FIG. 9A. FIG. 9B also shows an example of alignment fiducials 374 formed the two tab parts 320A and 320B One benefit to the two-part configuration of receptacle 300 is that it reduces adverse effects of any CTE mismatch between the receptacle and the underlying PIC 20. Because the two parts 301A and 301B of receptacle body 301 are separately secured to PIC 20, adverse effects of a CTE mismatch between the two parts and the PIC are reduced because the amount of material that resides between alignment features 340 is reduced as compared to a unitary (single-part) receptacle 300. This reduction in adverse effects of a CTE mismatch is particularly effective when receptacle body 301 is made of a polymer material, which has a higher CTE than silica or silicon.

Figure 9C:
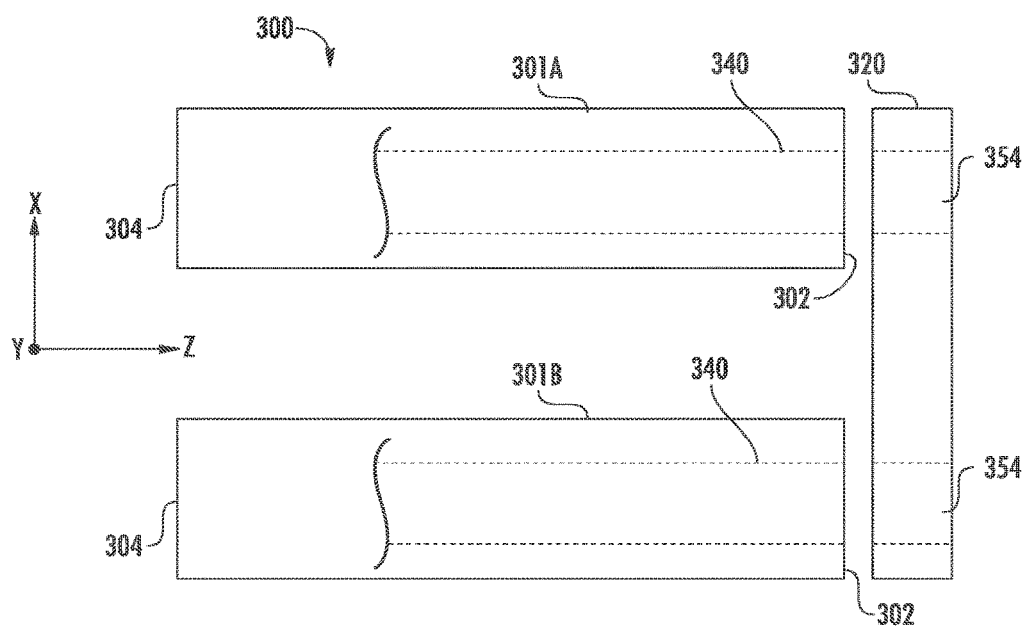
FIG. 9C is similar to FIG. 9A and shows an example configuration of a two-part receptacle and a one-part (unitary) tab.

FIG. 9C is similar to FIG. 9A and shows an example embodiment wherein tab 320 is unitary, i.e., is a single part, that attaches to the respective front ends 302 of the receptacle body parts 301A and 301B.

Forming the Receptacle

In an example, receptacle body 301 has a symmetry designed to facilitate the formation of receptacle 300. An example symmetric receptacle body 301 has a U-shaped cross section. The U-shape can be squared off or can have rounded edges. The techniques used for forming receptacle 300 include at least one of a polymer extrusion process, a glass extrusion process and a redraw process. A redraw process allows for receptacle body 301 to be formed to micron and even sub-micron tolerances. Such fabrication accuracy allows for passive alignment of receptacle 300 to PIC 20 if waveguides 32 are well-defined with respect to upper surface 22 of the PIC, i.e., by using the PIC upper surface as a reference datum for the y-dimension. Alignment features on receptacle 300 and PIC 20 can be used for alignment in the x-z plane. The recesses 390 discussed above can also be readily formed using the aforementioned extrusion and redraw processes.

Forming the Tab

As discussed above, tab 320 can be formed as a separate part from receptacle body 301, i.e., as a tab. In an example, tab 320 can be formed using a sheet of material, e.g., a sheet of glass. Example types of glass include thermally strengthened glass or an ion-exchanged glass, such as GORILLA® glass from Corning, Inc. An advantage of using a glass tab 320 is that any CTE mismatch with respect to interposer 70 is not substantial, especially when the interposer is also made of glass or silicon.

Figure 10A:
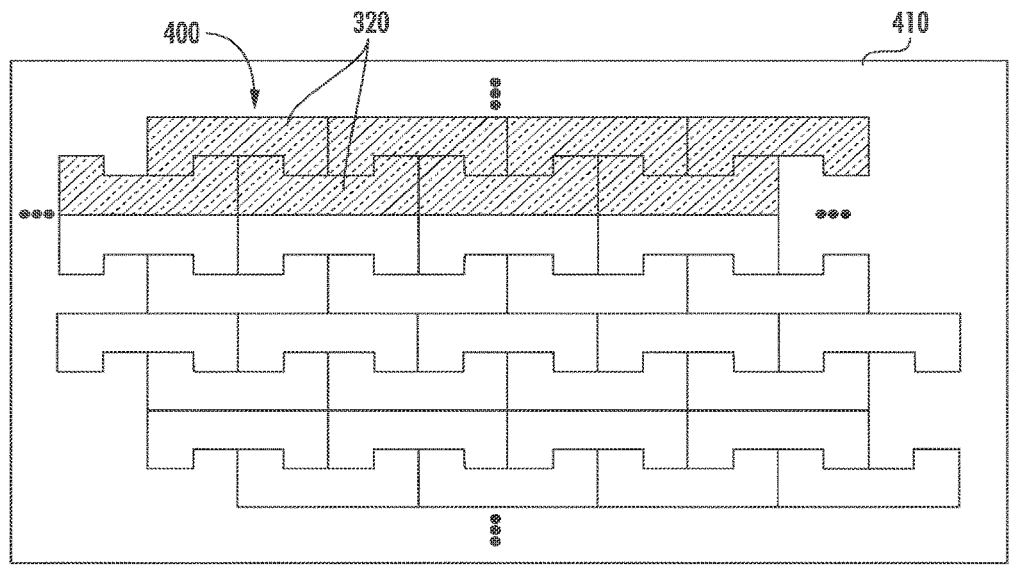
FIG. 10A and FIG. 10B are top-down views of templates used to form example U-shaped tabs in a sheet of spacer material.
Figure 10B:
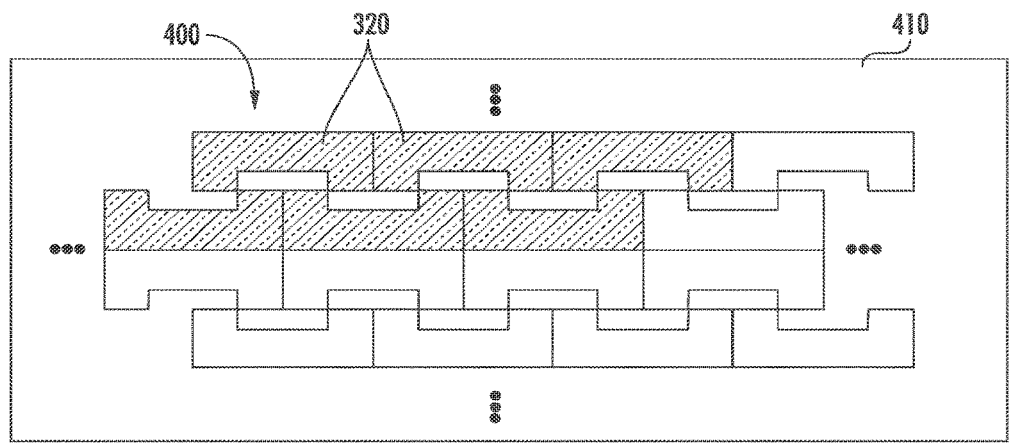

FIG. 10A and FIG. 10B are top-down views of templates 400 used to form example U-shaped tabs in a sheet 410 of spacer material. The outline of individual tabs 320 are shown on sheet 410 and the template has a geometry that keeps the material waste to a minimum when the sheet is cut to form the tabs. The holes 354 in the tabs 320 are not shown for ease of illustration, though they can be formed in sheet 410 prior to cutting to form the tabs. The cutting of sheet 410 can be accomplished using conventional means known in the art, such as using mechanical cutting (e.g., computer numerical control (CNC) cutting) or laser-based cutting. In an example, the tabs 320 can be further processed once formed. For example, a polishing process (e.g., laser polishing) can be used to round off or otherwise smooth the edges or corners of the tabs.

Figure 11:
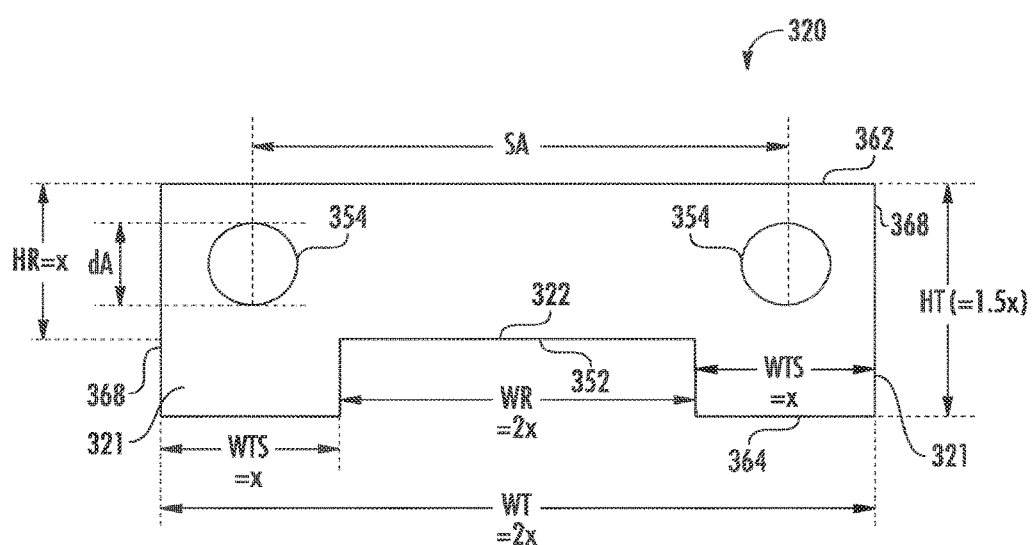
FIG. 11 is a front-on view of an example tab configured for use with an MTP type of plug.

FIG. 11 is a front-on close-up view of an example squared-off U-shaped tab 320. The tab 320 includes an upper edge 362, a lower edge 364, opposite sides 368, holes 354 and recess 322 formed in the lower edge. The recess 322 is defined by two tab sections 321 adjacent respective sides 368 and also defines the downward facing ledge 352. FIG. 11 also shows a number of important dimensions, including: a center-to-center alignment-feature spacing SA, an alignment feature diameter dA, an overall width WT, an overall height HT, a recess width WR, and an intermediate height HR defined by recess 322. The tab sections 321 have a width WTS. A general dimension "x" is also denoted. In an example, HR is equal to x, the width WTS of the tab sections 321 are also equal to x, WR is equal to 2x, SA is equal to 3x, and WT is equal to 4x.

In an example where receptacle 300 is configured to mate with plug 200 having a standard MT ferrule 201, the alignment feature spacing SA is 4.6 mm and the alignment feature diameter dA is 0.7 mm. Nominally, the alignment features 354 are centered in the middle of respective tab sections 321, which is a spacing of 3x, so 3x is about 4.6 mm. However, the alignment features 340 can be be larger or smaller. If larger, there needs to be clearance from the edge of the alignment feature 354 to the adjacent edge 368, so that 4x≥4.6+1.4 mm.

Additionally, the array 230 of optical fibers 232 and the array 30 of waveguides 32 need to fit within recess 322. For standard MTP connectors, the optical fiber pitch $p_F$ is 250 microns and there are 12 fibers, so that the recess width WR can be 2.75 mm. This means that 2x>2.75 mm. Finally, alignment features 240 needs to fit inside the respective tab sections 321, so x≥0.7 mm. This is a tighter constraint than the "2x" requirement and nominally at least 0.15 mm of material should be between alignment hole 240 and the adjacent side 368 so that x≥1 mm. This also satisfies the "3x" and "4x" criteria. A nominal value of x is 1.5 mm. For an alternate, more compact design, the fiber pitch $p_F$ can be reduced to be in the range from 100 microns to 125 microns. For a fiber pitch $p_F$=125 microns, the above dimensions for tab 320, including the diameter dF of alignment hole 340, can be reduced by half, thereby making x between 0.5 and 0.75 mm.

In an example, a glass fusion process can be used to form sheet 410 as a glass sheet. As noted previously, the precision of hole 354 need not have submicron accuracy.

Plug and Receptacle Alignment

Alignment of plug 200 and receptacle 300 can performed passively by using alignment fiducials 374 (see FIG. 1). The alignment may also be done actively by measuring the amount of optical power transmitted through waveguides 32 to optical fibers 232 in either direction (e.g., light traveling from PIC 20 to fibers 232 or vice versa). Active alignment can also be performed by having a dedicated loop-back circuit wherein light is injected into PIC 20 and detected remote to the PIC. Passive alignment can be performed by using machine vision or optical alignment techniques known in the art.

Once optimal alignment is achieved, then an epoxy bond (UV or thermal) or a laser bonding process can be performed using securing material 380 as described above. The result is an aligned optical interface device 100 that can be connected and disconnected in a manner similar if not identical to electrical interface devices, e.g., electrical connectors.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A coupling device for a photonic integrated circuit (PIC) assembly, the coupling device comprising:
    a body comprising a front end, an upper surface and a lower surface;
    at least one alignment feature at the front end of the body; and
    a tab at the front end of the body, the tab comprising a first downwardly depending tab section and a second downwardly depending tab section that each extend beyond the lower surface, wherein the tab defines a recess and the at least one alignment feature is vertically offset from the recess.

2. The coupling device of claim 1, wherein the tab defines a downward facing, open-ended recess.

3. The coupling device of claim 1, wherein the recess is an aperture within the tab.

4. The coupling device of claim 1, wherein the at least one alignment feature is at least one of a hole and a slot.

5. The coupling device of claim 1, wherein the at least one alignment feature comprises a hole and a slot.

6. The coupling device of claim 1, wherein the tab is integrally formed with the body.

7. The coupling device of claim 1, wherein the tab is secured to the front end of the body by a securing material.

8. The coupling device of claim 7, wherein the tab comprises at least one tab alignment feature that is aligned with the at least one alignment feature at the front end of the body.

9. The coupling device of claim 1, wherein the lower surface of the body comprises one or more recesses for receiving a securing material.

10. The coupling device of claim 1, wherein the body comprises one or more through holes between the upper surface and the lower surface for receiving a securing material.

11. An optical interface device comprising:
    the coupling device according to claim 1;
    a PIC assembly comprising:
        an upper surface;
        a front end; and
        a PIC that supports at least one waveguide comprising an end face at the front end of the PIC assembly, wherein the coupling device is coupled to the PIC assembly such that the lower surface of the body is coupled to the upper surface of the PIC assembly and the tab covers at least a portion of the front end of the PIC assembly.

12. The optical interface device of claim 11, further comprising a substrate comprising an upper surface and a front end, wherein:
    the PIC assembly comprises a lower surface that is coupled to the upper surface of the substrate; and
    the tab covers at least a portion of the front end of the substrate.

13. The optical interface device of claim 11, wherein:
    the body comprises a first part and a second part; and
    the first part and the second part are coupled to the PIC assembly such that the first part and the second part are separated from one another.

14. The coupling device of claim 13, wherein the first downwardly depending tab second and the second downwardly depending tab section are separate components.

15. The coupling device of claim 13, wherein the tab is a unitary tab that extends between the first part and the second part.

16. An optical interface device comprising:
    a photonic integrated circuit (PIC) assembly comprising:
        an upper surface;
        a front end; and
        a PIC that supports at least one waveguide comprising an end face at the front end of the PIC assembly;
    a body comprising a front end and a lower surface; and
    a tab secured to the front end of the body, wherein:
        the tab extends beyond the lower surface;
        the tab defines a downward facing ledge; and
        the tab covers at least a portion of the front end of the PIC assembly.

17. The optical interface device of claim 16, wherein the tab comprises a first downwardly depending tab section and a second downwardly depending tab section that define a recess.

18. The optical interface device of claim 17, wherein the tab has a U-shape.

19. The optical interface device of claim 17, wherein the recess is an aperture within the tab.

20. The optical interface device of claim 16, wherein:
the body further comprises at least one alignment feature at the front end of the body; and
the tab further comprises at least one tab alignment feature that is aligned with the at least one alignment feature at the front end of the body.

21. The optical interface device of claim 16, wherein the lower surface of the body comprises one or more recesses for receiving a securing material.

22. The optical interface device of claim 16, wherein the body comprises one or more through holes between the upper surface and the lower surface for receiving a securing material.

23. The optical interface device of claim 16, wherein the tab is formed of glass.

\* \* \* \* \*